US 6,549,781 B1

(12) United States Patent
O'Byrne et al.

(10) Patent No.: US 6,549,781 B1
(45) Date of Patent: Apr. 15, 2003

(54) SYSTEM AND METHODS FOR RAPIDLY DETERMINING CDMA NETWORK PERFORMANCE

(75) Inventors: Vincent A. O'Byrne, Boston, MA (US); Rajamani Ganesh, Bedford, MA (US); Dimitris Kalofonos, Watertown, MA (US); Donna Fagen, Lexington, MA (US); Ning Yang, Burlington, MA (US); Aline Yurik, Weston, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/547,970

(22) Filed: Apr. 12, 2000

Related U.S. Application Data

(60) Provisional application No. 60/170,790, filed on Dec. 15, 1999.

(51) Int. Cl.[7] .............................. H04Q 7/20; H04B 1/00
(52) U.S. Cl. .................... 455/446; 455/63; 455/422; 455/423; 455/424; 455/453; 455/448
(58) Field of Search .................... 455/62, 63, 67.1, 455/67.2, 67.3, 67.6, 423, 424, 68, 422, 446, 447, 453, 456, 500, 501, 448, 449, 450, 463, 517

(56) References Cited

U.S. PATENT DOCUMENTS

| | | | |
|---|---|---|---|
| 5,134,709 A | 7/1992 | Bi et al. ................... 455/33.1 |
| 5,398,276 A | * 3/1995 | Lemke et al. ............. 379/21 |
| 5,574,466 A | 11/1996 | Reed et al. ............... 342/359 |
| 5,710,758 A | 1/1998 | Soliman et al. .......... 370/241 |
| 5,809,423 A | 9/1998 | Benveniste ................ 455/452 |
| 5,963,867 A | 10/1999 | Reynolds et al. ........ 455/457 |
| 6,002,934 A | 12/1999 | Boyer et al. ............. 455/447 |
| 6,058,136 A | * 5/2000 | Ganesh et al. ........... 375/200 |
| 6,240,292 B1 | * 5/2000 | Haberman et al. ....... 455/439 |
| 6,111,857 A | * 8/2000 | Soliman et al. .......... 370/254 |
| 6,141,565 A | * 10/2000 | Feuerstein et al. ....... 455/560 |

OTHER PUBLICATIONS

Hanly S., "An Algorithm for Combined Cell–Site Selection and Power Control to Maximize Cellular Spread Sprectrum Capacity", IEEE Journal on Selected Areas in Communications, vol. 13, No. 7, Sep. 1995, pp. 1332–1340.

Yates R. and Huang C., "Integrated Power Control and Base Station Assignment", IEEE Transactions on Vehicular Technology, vol. 44, No. 3, Aug. 1995, pp. 634–644.

"Modeling the Hand–off Mechanism Effect on the In–Cell and Other–Cell Interference of IS–95 Cellular CDMA Networks", D. Kalofonos and D. Fagen—IEEE Vehicular Technology Conference, Sep. 1999, Amsterdam, Holland, pp. 1–5.

* cited by examiner

Primary Examiner—Edward F. Urban
Assistant Examiner—Meless Zewdu
(74) Attorney, Agent, or Firm—Leonard Charles Suchyta; James K. Weixel

(57) ABSTRACT

A system (200) provides a network designer with a mechanism by which to quickly estimate the performance of a code division multiple access wireless communication network. The system (200) allows the designer to enter a group of network and sector parameters. Based on these parameters, the user can choose one of three methods depending on a desire for speed, accuracy, and generality of result. The system (200) determines the pilot strength and interference for each location in the network. The system (200) determines pilot strength to interference values for each location. The system (200) estimates the performance of the communication network using these determined values and accounting for user-defined network parameters.

42 Claims, 10 Drawing Sheets

SYSTEM AND METHODS FOR RAPIDLY DETERMINING CDMA NETWORK PERFORMANCE

RELATED APPLICATION

This application claims priority under 35 U.S.C. § 119 based on U.S. Provisional Application Ser. No. 60/170,790, filed Dec. 15, 1999, the disclosure of which is incorporated herein by reference.

FIELD OF THE INVENTION

The present invention relates generally to communication systems and, more particularly, to systems and methods that quickly and accurately evaluate the performance of a Code Division Multiple Access (CDMA) based wireless network.

BACKGROUND OF THE INVENTION

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

In addition to the challenges posed by the need for greater system capacity, the designers of future wireless communication systems have their own unique set of challenges. For example, in order to engineer efficient wireless systems, designers need to be able to quickly evaluate the performance of the proposed wireless communication system while still maintaining accuracy.

A formal network analysis of a cellular installation is a computation-intensive, as well as time-consuming, process. Today, analysis of wireless system performance involves running full-scale simulations. These simulations, due to their complexity and accuracy, generally take several hours or days to get results. Therefore, if the system designer has no prior knowledge that the planned network will meet at least a minimum standard of performance, he or she can waste a lot of time waiting for and analyzing plans that will not work.

As a result, there exists a need for systems and methods that allow for a quick, yet accurate, evaluation of network performance prior to having to run full-scale simulations of the network under consideration.

SUMMARY OF THE INVENTION

Systems and methods consistent with the present invention address this need by providing a mechanism that quickly and accurately evaluates the performance of a communication network.

A method consistent with the present invention includes determining probable servers for every location in the communication network; determining the traffic load of each sector of the base stations in the network; determining a cell site transmit power; determining a total interference; determining analog hand-down traffic; generating a traffic map; re-computing the sector load, the cell site transmit power, and the total interference; and estimating the performance of the communication network using the re-computed sector load, cell site transmit power, and total interference.

In another implementation consistent with the present invention, a method includes determining pilot strength and interference at each location in the communication network, determining pilot strength to interference ratios at each location, and determining the performance of the network based on the determined ratios.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide a mechanism that quickly provides an estimate of the performance of a communication network design. A system, consistent with the present invention, determines the pilot strength and interference at each location in the communication network. The system then determines pilot strength to interference ratios for each location in the communication network and estimates the performance of the communication network based on the determined ratios.

EXEMPLARY NETWORK

Figure 1:
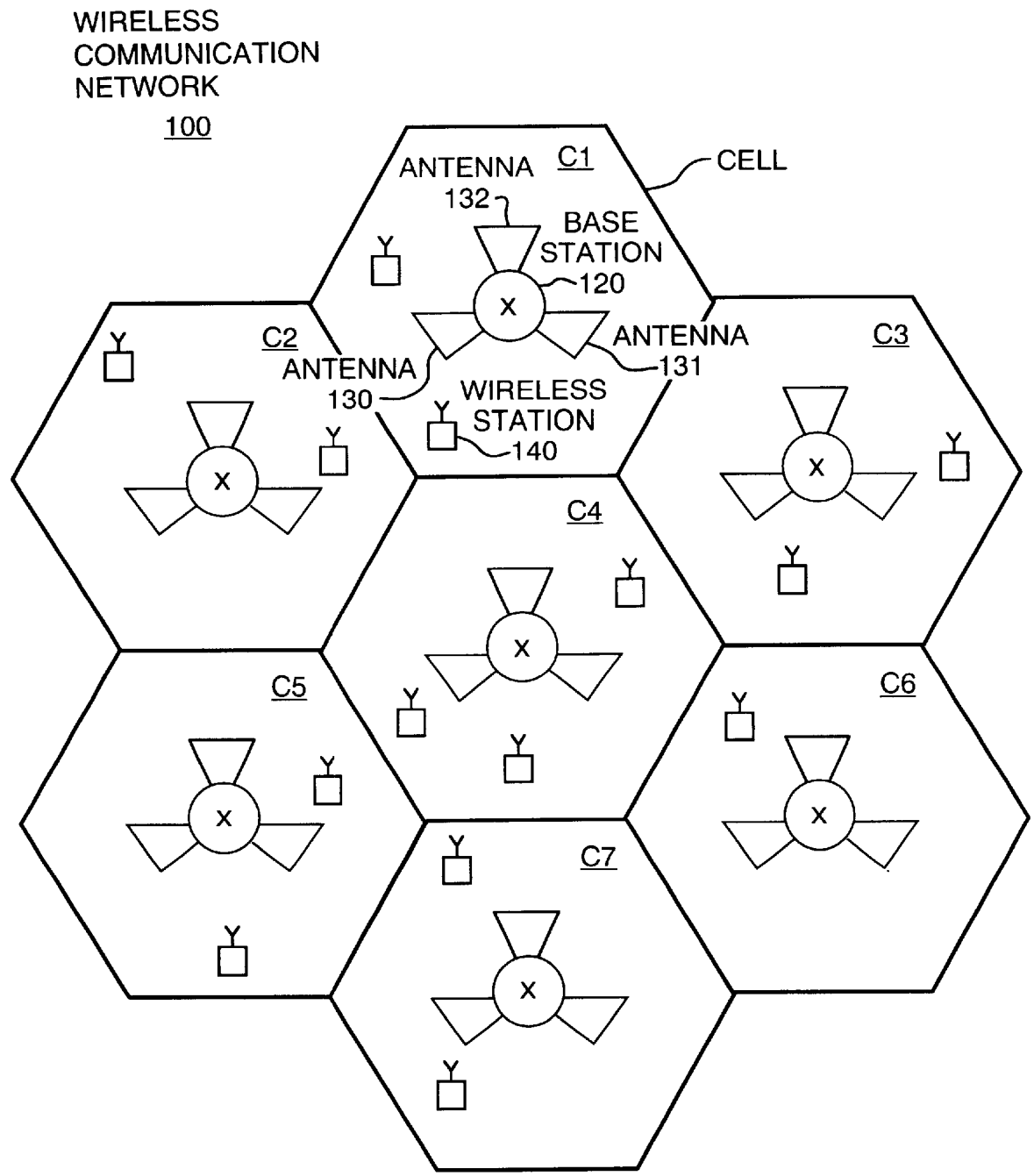
FIG. 1 illustrates an exemplary wireless communication network to which systems and methods that rapidly estimate network performance consistent with the present invention may be implemented.

FIG. 1 illustrates an exemplary wireless communication network 100 on which systems and methods, consistent with the present invention, capable of quickly estimating network performance may operate. In FIG. 1, network 100 includes several contiguous wireless coverage areas, or cells, C1–C7. While the network 100 shows only seven cells, the actual number of cells may be larger or smaller in practice.

Each of the cells C1–C7 includes a base station 120, having, for example, three directional antennas 130–132, and may, at any given time, include one or more conventional wireless stations 140. The base station 120 is a conventional base station that receives information from and transfers information to the wireless stations 140 via the directional antennas 130–132. The base station 120 may alternatively include one or more omni-directional antennas.

The wireless stations 140 are conventional wireless devices, such as a cellular telephone, a personal digital assistant, etc. Each wireless station 140 communicates with the base station 120 in a well-known manner.

EXEMPLARY SYSTEM CONFIGURATION

Figure 2:
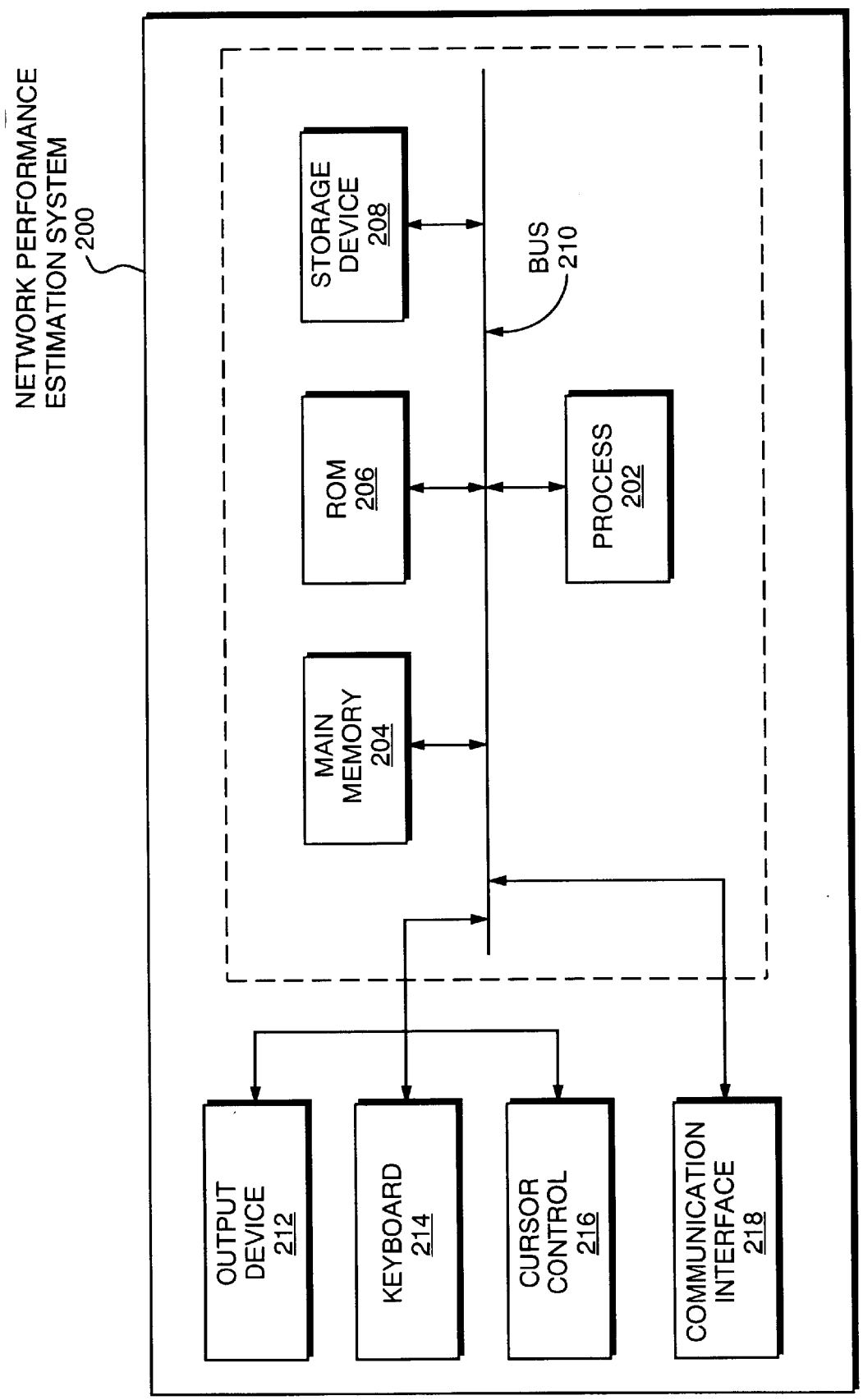
FIG. 2 illustrates an exemplary system, consistent with the present invention, for estimating the performance of a network.

FIG. 2 illustrates an exemplary system 200, consistent with the present invention, for quickly and accurately estimating the performance of a wireless network, such as network 100. The exemplary system 200 may be included in the wireless communication network 100 (e.g., in base station 120) or may be separate therefrom.

In FIG. 2, the exemplary system 200 includes a processor 202, main memory 204, read only memory (ROM) 206, storage device 208, bus 210, output device 212, keyboard 214, cursor control 216, and communication interface 218.

The processor 202 may be any type of conventional processing device that interprets and executes instructions. Main memory 204 may be a random access memory (RAM) or a similar dynamic storage device. Main memory 204 stores information and instructions for execution by processor 202. Main memory 204 may also store temporary variables or other intermediate information used during execution of instructions for use by processor 202. ROM 206 stores static information and instructions for processor 202. ROM 206 may be replaced with some other type of static storage device. The data storage device 208 may include any type of magnetic or optical disk and its corresponding disk drive. Data storage device 208 stores information and instructions for use by processor 202. Bus 210 includes a set of hardware lines (conductors) that allows for data transfer among the components of the system 200.

The output device 212 includes one or more devices for providing information to an operator. The output device 212 may include, for example, a display, a printer, a graphical plotter, etc. The keyboard 214 and cursor control 216 allow the operator to interact with the system 200. The cursor control 216 may include, for example, a mouse, a pen, voice recognition and/or biometric mechanisms, and the like.

Communication interface 218 enables the system to communicate with other devices/systems via any communications medium. For example, communication interface 218 may be a modem or an Ethernet interface to a local area network (LAN). Alternatively, communication interface 218 may be any other interface that enables communication between the system 200 and other devices or systems.

The system 200 performs the functions necessary to estimate the performance of a wireless communication network in response to processor 202 executing sequences of instructions contained in, for example, memory 204. Such instructions may be read into memory 204 from another computer-readable medium, such as data storage device 208, or from another device via communication interface 218. Execution of the sequences of instructions contained in memory 204 causes processor 202 to perform a method that will be described hereafter. Alternatively, hardwired circuitry may be used in place of or in combination with software instructions to implement the present invention. Thus, the present invention is not limited to any specific combination of hardware circuitry and software.

EXEMPLARY PROCESSES FOR ESTIMATING NETWORK PERFORMANCE

The process of designing a network can be both a time and computation-intensive task. Before committing to a complete network analysis (which can take from hours to days to complete), there is typically a need to quickly assess, without extensive detail, the proposed network's performance for a certain set of parameters. Traditionally, this process depended entirely on the network designer's experience.

In an implementation consistent with the present invention, three reduced-complexity estimation processes are provided that offer the network designer the tools for a rapid, yet more objective, network performance assessment. The processes are denoted hereinafter as: "Ec/Io Analysis," "Pilot Management," and "Initial Estimation." These processes are considered to be of "reduced-complexity" in that they calculate the interference in each location of a communication network without having to run a full-scale analysis. The "Ec/Io Analysis" and "Pilot Management" processes estimate network performance using "user-defined" parameters. The "Initial Estimation" process uses pre-calculated simulation results from, for example, off-line databases to estimate a network's performance.

Each of these processes provides data to help make the decision whether to a perform a full-scale analysis of a proposed network design or to change the initial settings of the network design. The Ec/Io Analysis, Pilot Management, and Initial Estimation processes provide the network designer with a trade-off between accuracy, speed of calculation, and generality of results.

The Ec/Io Analysis produces a quick estimate of the most probable server (i.e., the base station that provides a given location with the strongest signal) per location by using simple, user-defined transmit power and number of traffic channel assumptions. More specifically, the Ec/Io Analysis helps determine which of the pilots, available at a specific location, is most suitable by measuring the ratio of the pilot strength (Ec) to the total interference (Io) at that location and representing the strongest level. The result of this analysis can be graphically presented to the user in order to illustrate potential problem areas (e.g., areas having too many suitable pilots above a threshold, or too few) in the proposed network design.

The Pilot Management process identifies, for example, areas of possible problems for pilot pollution. This process provides a more accurate estimation than the Ec/Io Analysis, at the cost of a longer computation cycle, by allowing the network performance to be calculated on a location-by-location basis. The Pilot Management process provides a detailed list of base stations that have a ratio of pilot channel power relative to the interference at that location above a threshold. These thresholds are defined by the designer and represent a compromise between the need to improve performance and the cost of supplying additional resources.

The Initial Estimation process can use more highly grained traffic data than the Ec/Io Analysis and Pilot Management processes to estimate the overall interference, which in turn is used to estimate the most probable server per location and hand down traffic to an analog cellular system where applicable. The Initial Estimation process deals directly with offered traffic in the form of a traffic map (representation on a location-by-location basis) and uses pre-calculated simulation results to estimate the overall performance. The Initial Estimation process deals with additional complexity, although less than a full-scale analysis, in the manner in which the traffic is presented and results in potentially increased accuracy over the Ec/Io Analysis and Pilot Management processes at the cost of a longer computation cycle.

While the following description indicates the use of the Ec/Io Analysis, Pilot Management, and Initial Estimation processes for the analysis of a CDMA network, it will be appreciated that the present invention is not so limited. In fact, systems and methods consistent with the present invention are equally applicable to the analysis of other types of networks.

EXEMPLARY PROCESS FOR ANALYZING EC/IO

Figure 3:
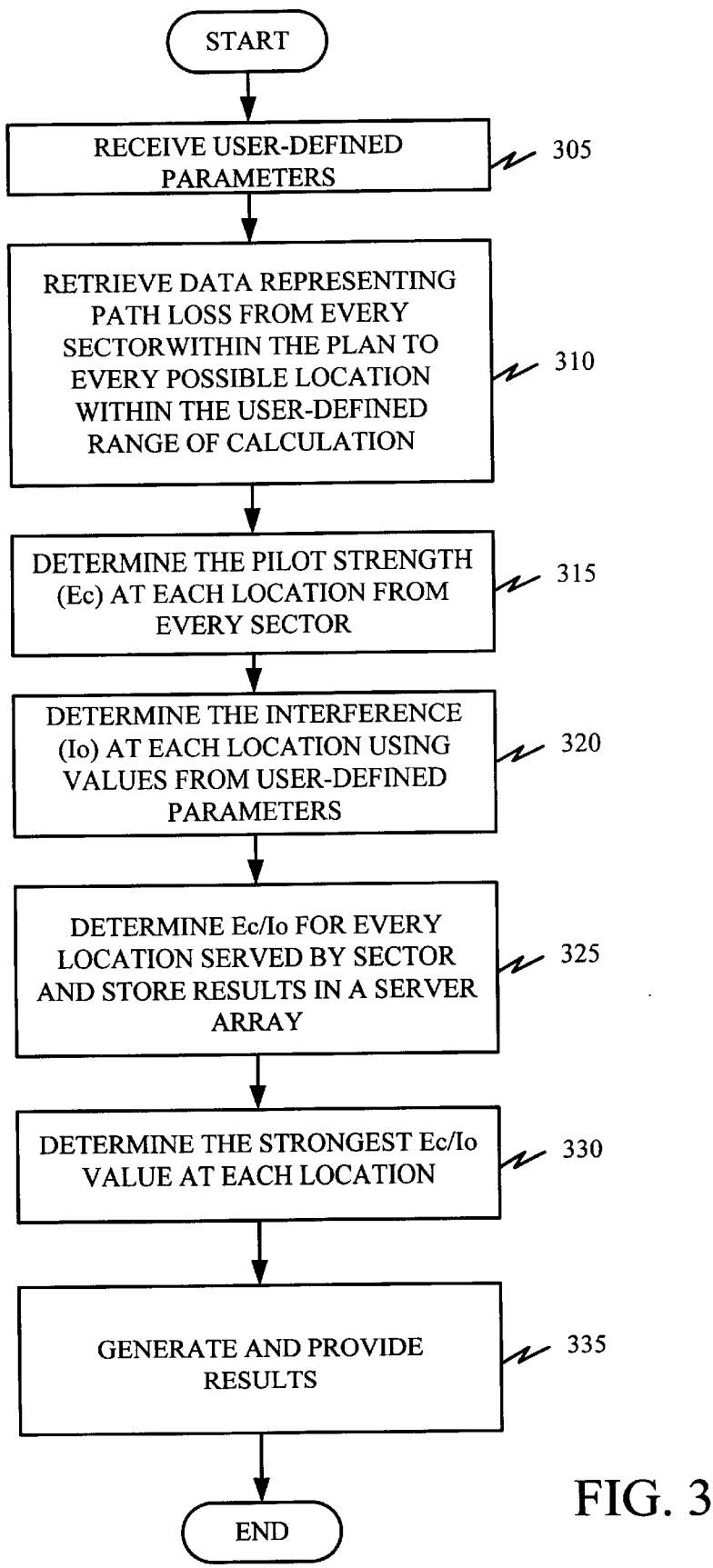
FIG. 3 illustrates an exemplary process for analyzing pilot strength to interference (Ec/Io) ratios consistent with the present invention.

FIG. 3 illustrates an exemplary process for analyzing Ec/Io consistent with the present invention. The exemplary process begins with a user (e.g., a radio engineer or network designer) entering a group of network attributes (or parameters) [step 305]. These parameters may include such information as pilot information, synchronization information, paging, forward cable loss, head loss, frequency, portable antenna gain, portable noise figure, sector size, sector type, number of channels, power per channel, etc.

The Ec/Io Analysis process may use previously generated path loss files from a propagation module, if they exist, to determine the path loss Pl from every sector within the plan to every location within the sector's range of calculation (or coverage area) [step 310]. The process ignores any location that has inadequate field strength (e.g., a location lying outside the user-specified range of calculation of a particular sector).

The Ec/Io Analysis process determines the received CDMA pilot power at each location from every sector within its range of calculation [step 315]. The received pilot power is given by $$R_{pilot,j} = P_{pilot,j} - L_{fw\_c,j} + G_{t,j} + G_m - Pl_j \quad (1)$$

where $P_{pilot,j}$ is the CDMA pilot power in dBW at sector j, $G_{t,j}$ is the antenna gain of sector j in dBi in the direction of the location of interest, $G_m$ is the antenna gain of the wireless station at the location in dBi as seen by the base station, $L_{fw\_c,j}$ is the forward cable loss at this sector, and $Pl_j$ is the path loss between this location and sector j.

The Ec/Io Analysis process then calculates the interference $I_o$ at each location using the path loss files and the power values and number of traffic channels from the user-defined parameters [step 320]. The interference for a location can be determined by:

$$I_0 = \sum_{j=1}^{M} R_{sync,j} + \sum_{j=1}^{M} R_{paging,j} + \sum_{j=1}^{M} \sum_{i=1 to n} R_{traffic,j} + \sum_{j=1}^{M} R_{pilot,j} \quad (2)$$

where M is the number of sectors within whose ranges of calculations (or coverage area) the wireless station resides, n is the number of traffic channels input by the user, $R_{sync,j}$, $R_{paging,j}$, $R_{traffic,j}$, and $R_{pilot,j}$ are the powers received at this location from the synchronization, paging, traffic and pilot channels of sector j, respectively, and are given by:

$$R_{sync,j} = P_{sync,j} - L_{fw\_c,j} + G_{t,j} G_m + Pl_j \quad (3)$$

$$R_{traffic,j} = P_{traffic,j} - L_{fw\_c,j} + G_{t,j} + G_m - Pl_j \quad (4)$$

$$R_{paging,j} = P_{paging,j} - L_{fw\_c,j} G_{t,j} + G_m - Pl_j \quad (5)$$

where $P_{sync,j}$ and $P_{paging,j}$ denote, respectively, the transmit powers of the sync and paging channels, and $P_{traffic,j}$ represents the traffic power of a traffic channel at sector j as input by the user.

The Ec/Io Analysis process determines $E_{c,j}/I_o$ for every location that lies within the sector j range of calculation, where $j \in \{1 \ldots M\}$, and $E_{c,j} = R_{pilot,j}$. Therefore, $E_{c,j}/I_o$ can be represented by:

$$E_{c,j}/I_o = R_{pilot,j}/I_o. \quad (6)$$

The exemplary Ec/Io Analysis process then stores the calculated values of $E_{c,j}/I_o$ in a data array [step 325].

The process then determines the strongest Ec/Io values for each location [step 330]. The Ec/Io Analysis process generates and provides the results to the user [step 335]. The results may be provided to the user via any conventional technique. For example, the results may be provided visually to the user via a display device.

Figure 4:
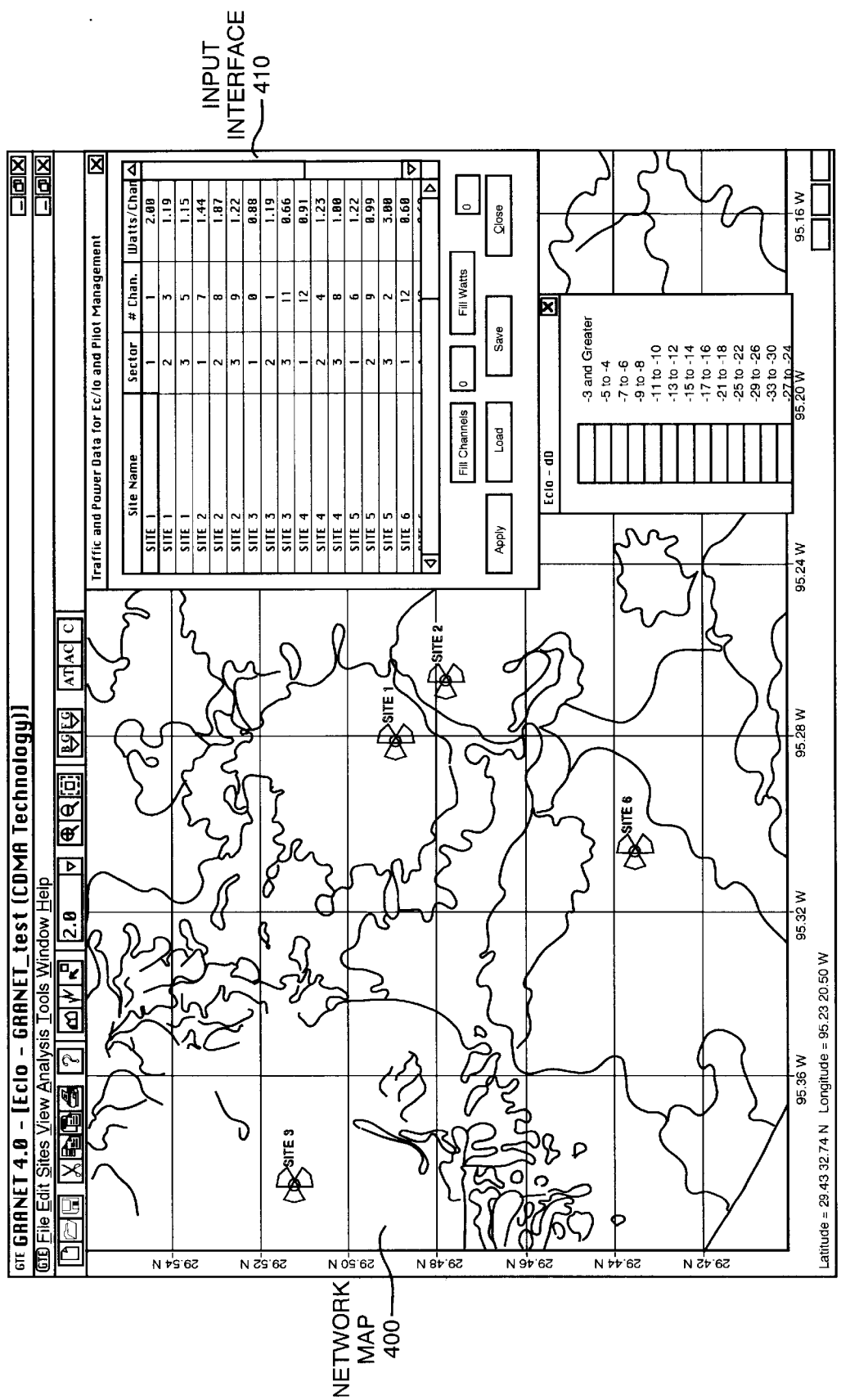
FIG. 4 illustrates an exemplary graphical display of the results of an Ec/Io analysis process consistent with the present invention.

FIG. 4 illustrates an exemplary graphical display of the results of an Ec/Io Analysis process consistent with the present invention. In FIG. 4, the exemplary graphical display includes a network map 400 and an input interface 410. The network map 400 illustrates the location of base stations (denoted, for example, site1, site2, etc.) in the communication network. The different shading in the network map 400 represents different levels of Ec/Io values. The input interface 410 allows a user to enter such information as the number of traffic channels per sector and the traffic channel power to be used in the network performance estimation.

The exemplary process for analyzing Ec/Io provides a network designer with the ability to quickly estimate the performance of a network under consideration. As such, the process eliminates the need for a designer to run complete network analyses for every network plan under consideration. Unlike conventional network performance estimation techniques that take hours to complete, the above-described process can provide designers with a quick estimate of the network's performance in minutes. Moreover, while previous estimation techniques assumed only one channel per base station operating at nominal power, the Ec/Io process considers multiple attributes (e.g., the actual number of traffic channels in each sector and the actual power per channel) in its computation. As such, the Ec/Io process provides an accurate estimation of system performance.

EXEMPLARY PILOT MANAGEMENT PROCESS

Figure 5A:
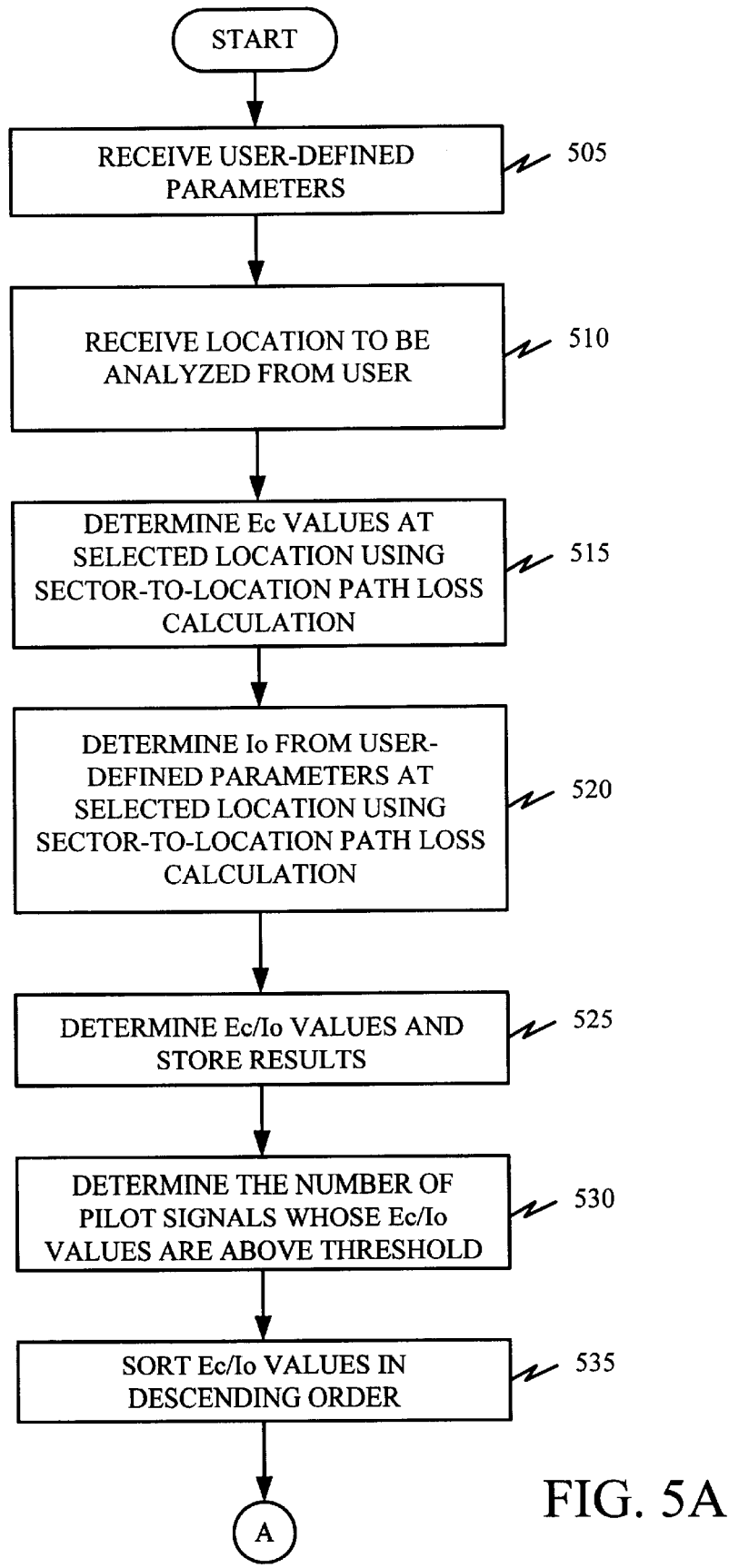
FIGS. 5A and 5B illustrate an exemplary Pilot Management process consistent with the present invention.
Figure 5B:
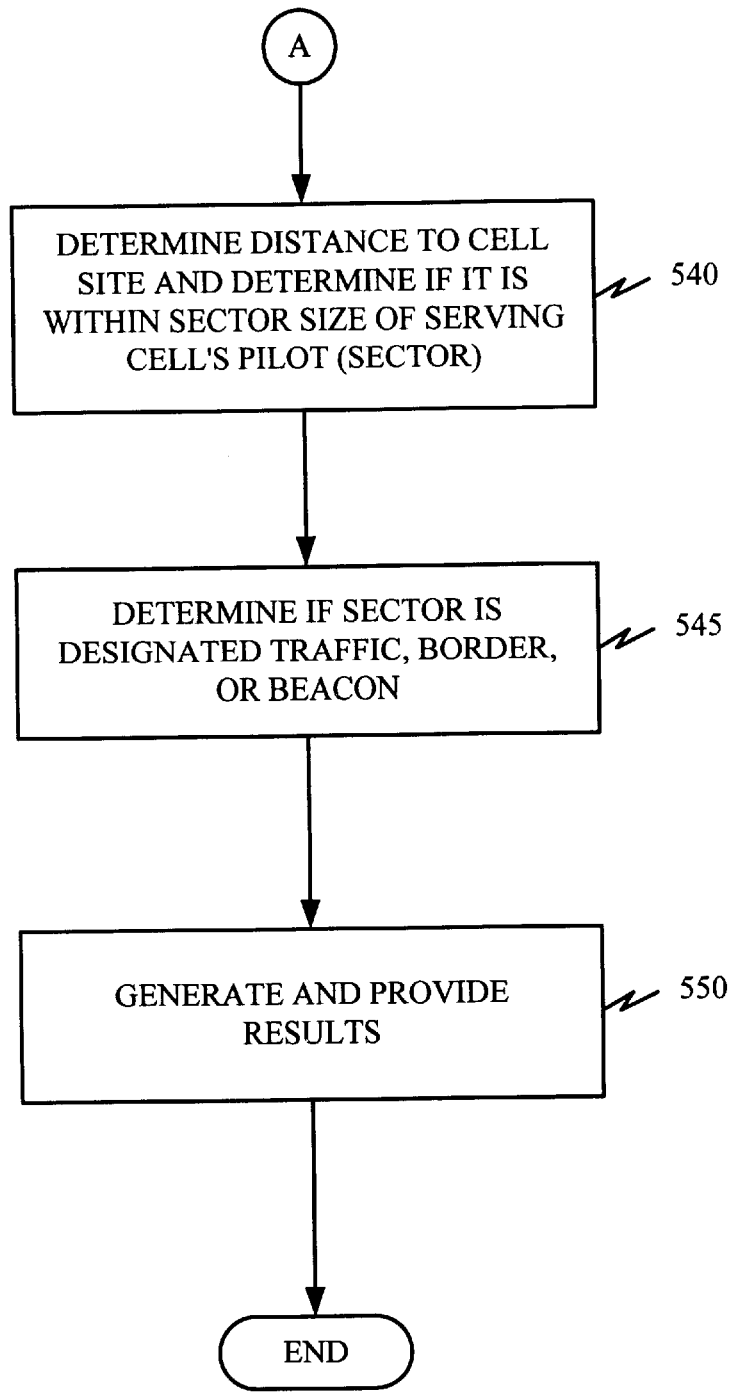

FIGS. 5A and 5B illustrate an exemplary Pilot Management process consistent with the present invention. Similar to the process that analyzes Ec/Io, the Pilot Management process begins with a user (e.g., a radio engineer or network designer) entering a group of network parameters [step 505]. These parameters may include such information as pilot information, synchronization information, paging, forward cable loss, head loss, frequency, portable antenna gain, portable noise figure, sector size, sector type, number of channels, and power per channel. The user also inputs the location in the communication network that is to be analyzed [step 510].

The Pilot Management process determines the received CDMA pilot power at each location from every sector within its sector size and range of calculation [step 515]. The received pilot power is given by equation (1) above.

The Pilot Management process determines, based on power values from the user-defined parameters, the interference (Io) at the selected location in the network using a sector-to-wireless station path loss calculation from every sector [step 520]. Unlike the exemplary Ec/Io Analysis process described above, the exemplary Pilot Management process does not use path loss files, but rather a sector-to-wireless station path loss calculation. The interference for the user-selected location can be determined using equations (2)–(5) above.

Similar to the Ec/Io Analysis, the Pilot Management process determines $E_{c,j}/I_o$ for the selected location in the network and stores the calculated values of $E_{c,j}/I_o$ in a data array [step 525]. The Pilot Management process determines all Ec/Io values at the selected location that are above a predefined, user-supplied, threshold [step 530]. The threshold is typically a very low value used to eliminate locations where the received pilot power is so low that pilot acquisition becomes impossible.

The process may sort (or rank) the received pilot powers at each location in descending order (strongest first) [step 535]. The sorting process also takes into the account whether the wireless station can use the server in the handoff process. This occurs by employing the user-defined "sector size."

The Pilot Management process determines the distance from the selected location to the cell site (or base station) and determines whether the selected location is within the sector size of the pilot (sector) [step 540]. As set forth above, the user provides the sector size value during the initial stages of the Pilot Management process. The Pilot Management process then determines whether the sector is a traffic sector, a beacon sector, or a border sector [step 545].

Finally, the process generates and provides the results to the user [step 550]. The results may be provided to the user in any conventional manner, such as a graphical display. The Pilot Management process may provide the user with a ranked list of Ec/Io values that are above the user-defined threshold at the user-selected geographical location in the communication network and whether the pilots can contribute to the signal or just to the interference.

Figure 6:
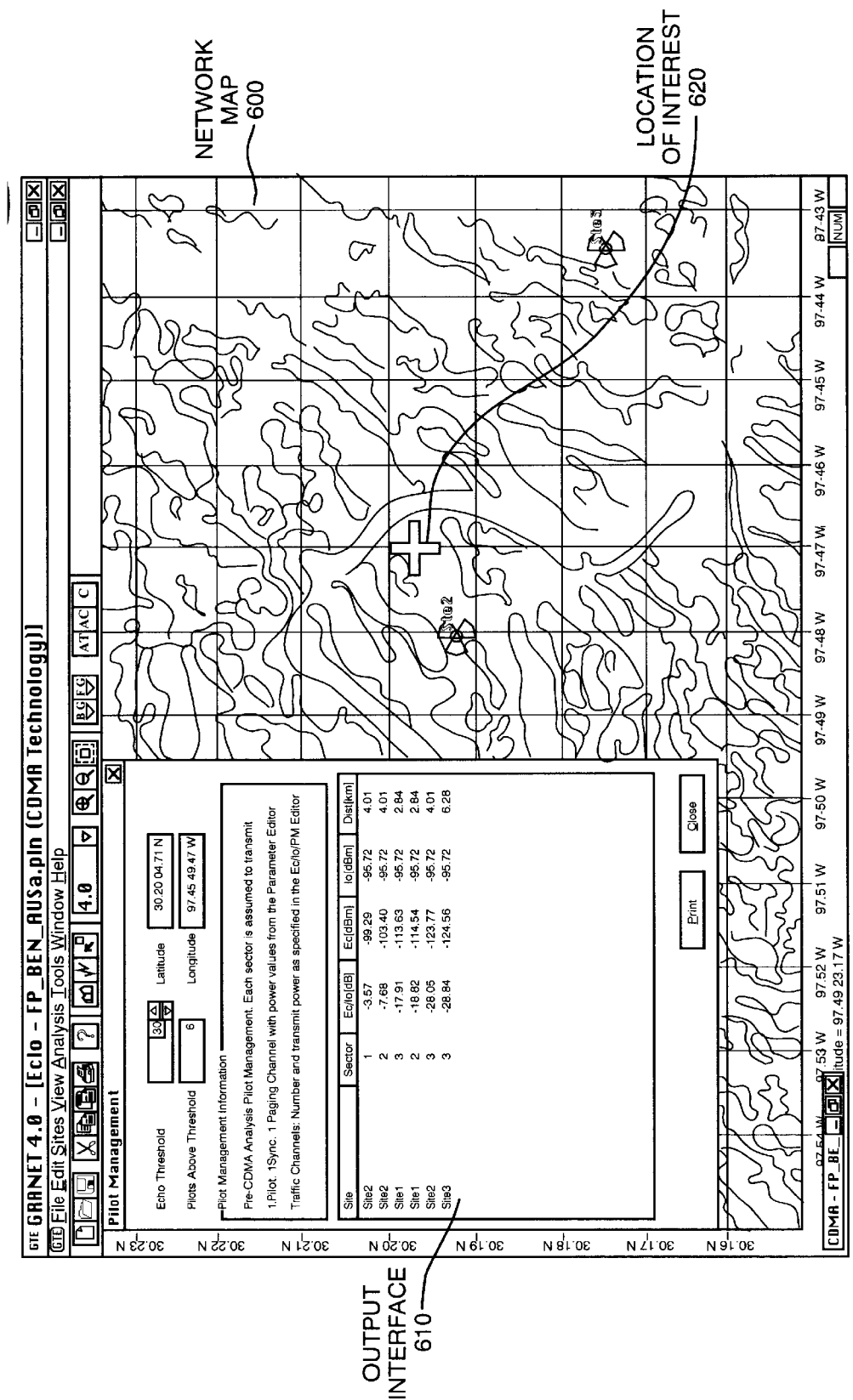
FIG. 6 illustrates an exemplary graphical display of the results of a Pilot Management process consistent with the present invention.

FIG. 6 illustrates an exemplary graphical display of the results of a Pilot Management process consistent with the present invention. In FIG. 6, the exemplary graphical display includes a network map 600, an output interface 610, and a position in the network map 600 that represents a location of interest 620. The network map 600 illustrates the location of a group of base stations (e.g., site 1, site 2, etc.) in the network plan. The output interface 610 provides the user with a graphical display of the Ec/Io values that are above a user-defined threshold for the selected location 620 in the network map 600. The exemplary graphical display may also include an input interface (not shown) that allows the user to enter network attributes, such as the number of traffic channels per sector and the traffic channel power.

Unlike the output of the Ec/Io Analysis process where the network map was shaded to represent different levels of Ec/Io, the output of the Pilot Management process may provide a ranked list of sectors that provide Ec/Io values above a threshold for a selected location on the map. For example, at a latitude of 30 20 04.71 N and a longitude of 97 45 49.47 W on the exemplary map 600, six base stations are listed in the output interface 610 as having an Ec/Io value above the user-defined threshold of –30 dB. The Pilot Management process focuses on user-defined locations, but considers all active sectors as possibly contributing to the signal and/or interference.

This Pilot Management process provides a quick and accurate estimate of network performance. Similar to the process that analyzes Ec/Io described above, the Pilot Management process can provide designers with a quick and accurate estimate of the network's performance in minutes, as opposed to hours using conventional estimation techniques.

A Pilot Management process, consistent with the present invention, provides a user, for example, with a representation of those areas in the planned network having pilot pollution. That is, the process provides a user with an indication of those locations in the network where there are too many signals of sufficient strength, such that the wireless station cannot demodulate them all. For example, presently up to three signals can be demodulated. All other signals will cause interference and/or excessive promotion to and from the active set of the pilots at the locations.

Figure 7:
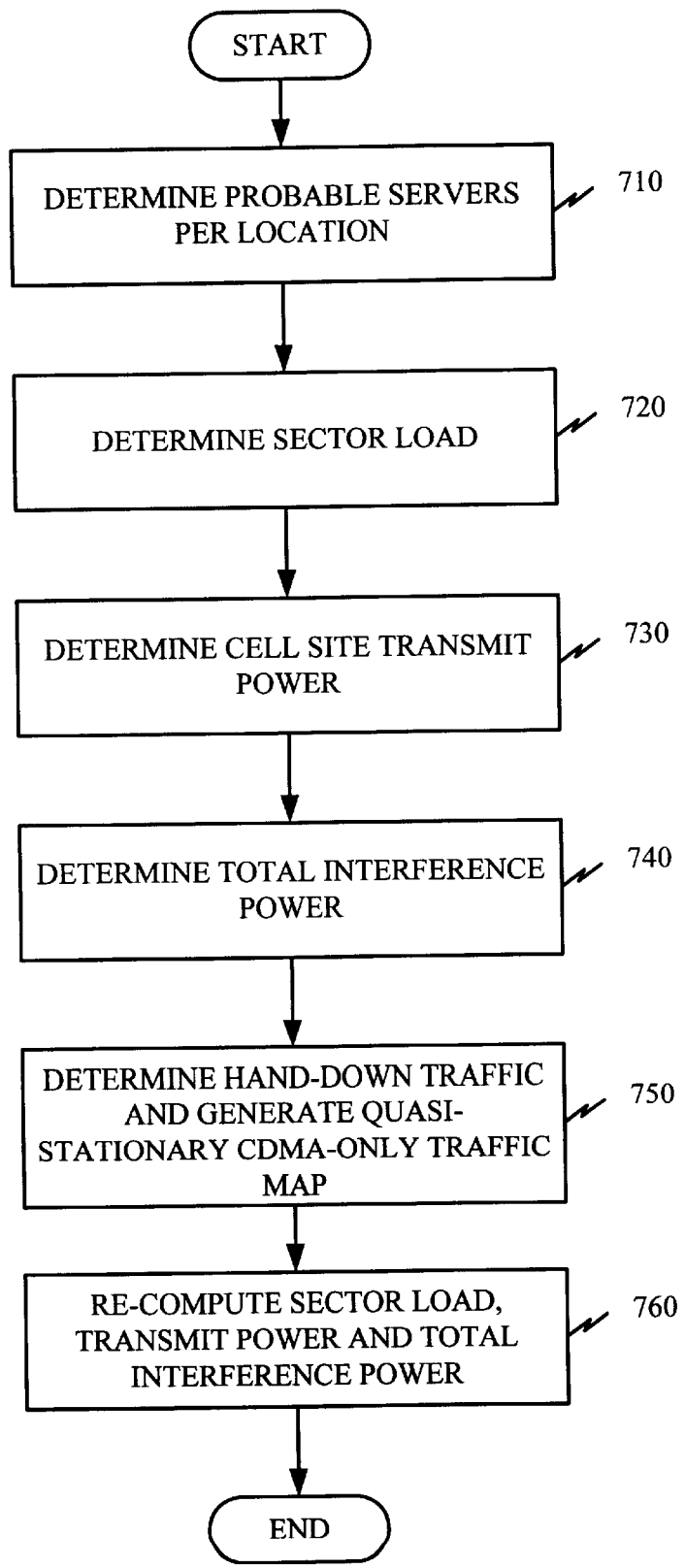
FIG. 7 illustrates an exemplary process, consistent with the present invention, for performing an initial estimation of a wireless network.

While previous estimation techniques assumed only one channel per base station operating at nominal power, the Pilot Management process considers multiple attributes (e.g., the actual number of traffic channels in each sector and the actual power per channel) in its computation. As such, the Pilot Management process provides an accurate estimation of system performance. EXEMPLARY INITIAL ESTIMATION PROCESS FIG. 7 illustrates an exemplary initial estimation process consistent with the present invention. The exemplary initial estimation process performs the following steps, each of which will be described in more detail below:

Determine probable servers per location [step 710];

Determine sector load [step 720];

Determine cell site transmit power [step 730];

Determine total interference power [step 740];

Determine hand-down traffic and generate CDMA-only traffic map [step 750]; and

Re-compute sector load, transmit power and total interference power [step 760].

I. Determine CDMA Probable Servers Per Location [Step 710]

Figure 8A:
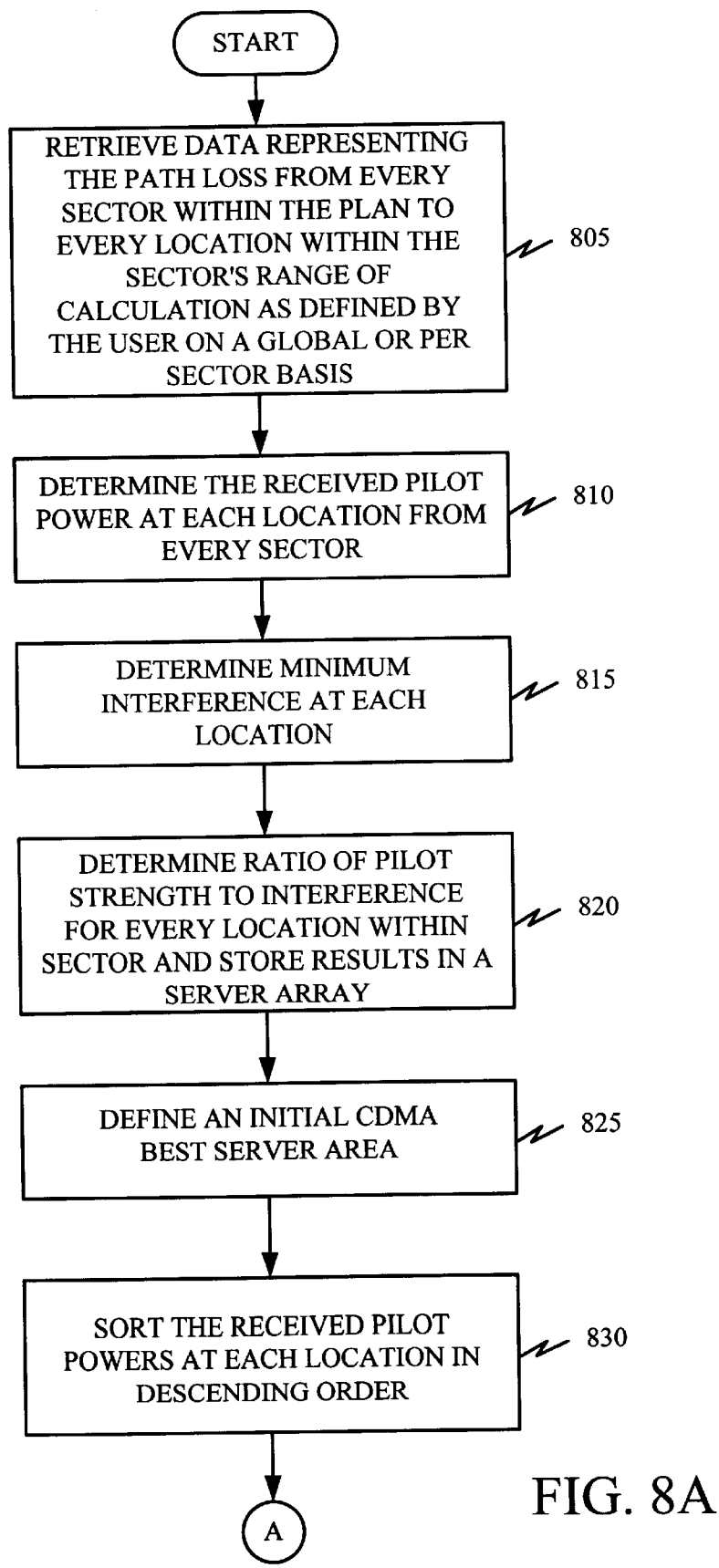
FIGS. 8A and 8B illustrate an exemplary process, consistent with the present invention, for determining probable servers for each location of a wireless communication network.
Figure 8B:
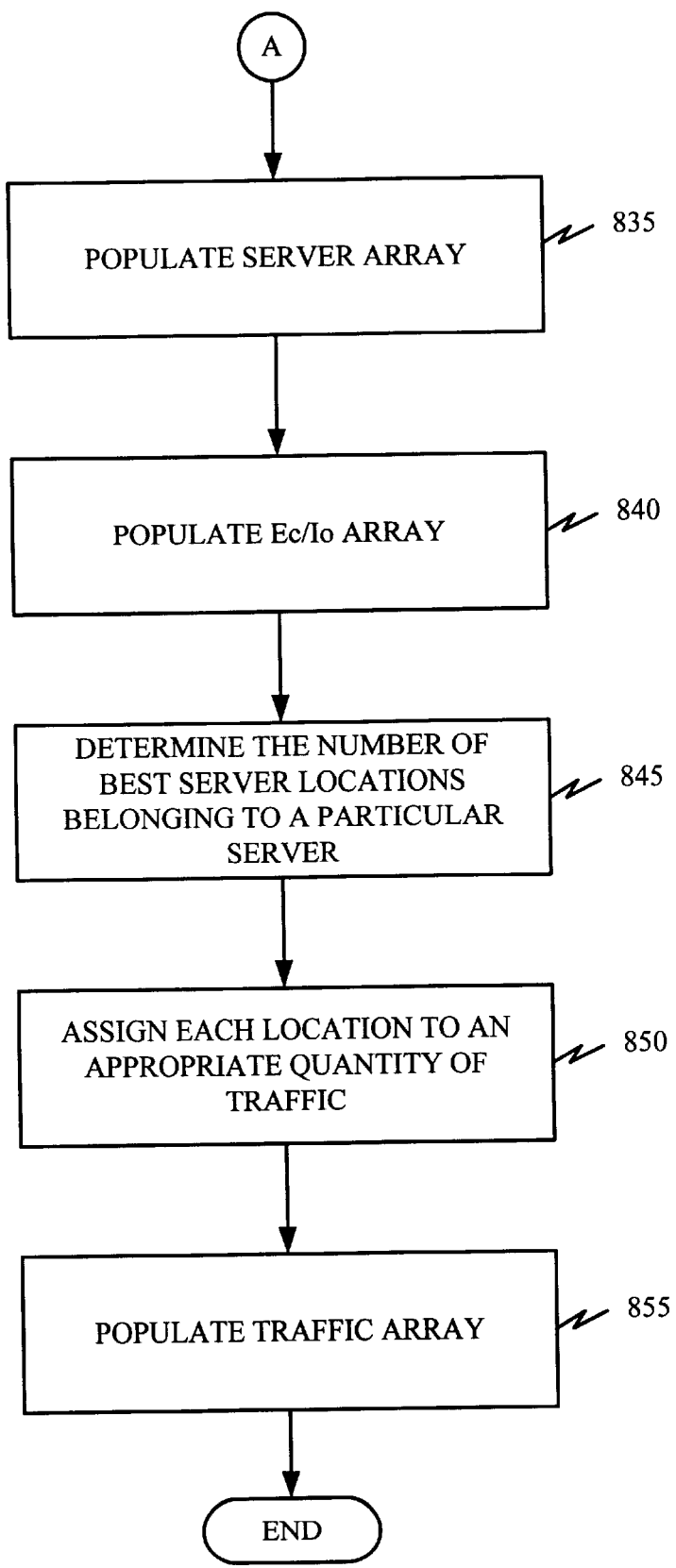

The exemplary initial estimation process determines CDMA probable servers for each location in the communication network. FIGS. 8A and 8B illustrate an exemplary process for determining CDMA probable servers per location. The exemplary process uses path loss files from a propagation module to determine the path loss Pl from every sector within the plan to every wireless station within the sector's range of calculation [step 805]. The process ignores any location having inadequate field strength (e.g., a location lying outside the range of calculation of a particular sector) or needs to be ignored due to Land Use Land Cover (LULC) weightage or highway enhancements or whose pilot power is sufficiently small.

The process determines the received CDMA pilot power at each wireless station location from every sector (which is not a beacon sector) within its sector size and range of calculation [step 810]. The received pilot power is determined by:

$$R_{pilot,j} = P_{pilot,j} - L_{fw\_c,j} + G_{t,j} + G_m - Pl_j \quad (7)$$

here $P_{plot,j}$ is the CDMA pilot power in dBW at sector j, $G_{t,j}$ is the antenna gain of sector j in dBi in the direction of the location of interest, $G_m$ is the antenna gain of the wireless station in that location in dBi as seen by the base station, $L_{fw\_c,j}$ is the forward cable loss at this sector, and $Pl_j$ is the path loss between this location and sector j.

The process then determines the minimum interference $I_{tot\_min}$ at each location [step 815]. The interference for a location can be determined by:

$$I_{tot\_min} = \sum_{j=1}^{M} R_{sync,j} + \sum_{j=1}^{M} R_{paging,j} + \sum_{j=1}^{M} R_{traffic,j} + \sum_{j=1}^{M} R_{pilot,j} \quad (8)$$

where M is the number of sectors within whose ranges of calculations the location resides, $R_{sync,j}$, $R_{paging,j}$, $R_{traffic,j}$, and $R_{pilot,j}$ are the powers received at this location from the synchronization, paging, traffic and pilot channels of sector j, respectively, and are given by, $$R_{sync,j} = P_{sync,j} - L_{fw\_c,j} + G_{t,j} + G_m - Pl_j \quad (9)$$

$$R_{traffic,j} = P_{traffic\_min,j} - L_{fw\_c,j} + G_{t,j} + G_m + Pl_j \quad (10)$$

$$R_{paging,j} = P_{paging,j} - L_{fw\_c,j} + G_{t,j} + G_m - Pl_j \quad (11)$$

where $P_{sync,j}$ and $P_{paging,j}$ denote, respectively, the transmit powers of the sync and paging channels, and $P_{traffic\_min,j}$ represents the minimum transmit power (i.e., the it minimum power control allocation) of a traffic channel at sector j. It should be noted that this power is only representative of the lowest possible traffic power. Other values, such as an average value, are also valid. The process assumes initially that there is only one sync, one paging and one traffic channel per sector. It should be noted that the computation of $I_{tot\_min}$ is independent of sector sizes or beacon sectors.

The process calculates $E_{c,j}/I_{tot\_min}$ for every location which lies within the sector size of sector j, where j∈{1 . . . M}, j≠beacon_sector and $E_{c,j} = R_{pilot}$. Therefore, $E_{c,j}/I_{tot\_min}$ can be represented as:

$$E_{c,j}/I_{tot\_min} = R_{pilot,j}/I_{tot\_min} \quad (12)$$

The process then stores the calculated values of $E_{c,j}/I_{tot\_min}$ in a data array [step 820]. It is assumed for explanatory purposes that the process stores the data in an array denoted: temp_EcIo[map_size][no_cdma_sectors], where, for example, temp_EcIo[p][200] contains the pilot $E_c/I_{tot\_min}$ from sector 200 at location p. The term no_cdma_sectors represents the total number of CDMA sectors in the plan.

The process defines an initial CDMA best server area [step 825]. The process defines a wireless station (or location) to be in the best server of sector j if the conditions given by the following equations (13) and (14) are satisfied:

$$E_{c,j}/I_{tot\_min} > (E_c/I_o)_{threshold} \quad (13)$$

$$E_{c,j}/I_{tot\_min} > E_{c,i}/I_{tot\_min}, \forall \text{ sector } i \in \{1 \ldots M\} \text{ and } i \neq j. \quad (14)$$

The threshold value $(E_c/I_o)_{threshold}$ is defined internally as a global parameter. It is typically a very low value used to eliminate locations where the received pilot power is so low that pilot acquisition becomes impossible. The process assumes that any locations where the above conditions are not satisfied are determined not to have any CDMA traffic or coverage under the loading conditions as stated above.

The process may sort (or rank) the received pilot powers at each location in descending order (strongest first) [step 830]. The sorting process also takes into the account the sector size of each sector and ignores beacon sectors. The process then populates a CDMA probable servers' CDMA_Server array with the highest ranking pilots of an active set at any location [step 835]. This array may be two-dimensional with the first dimension map_size having a size equal to the number of locations on the map and the second dimension active_set_size having a size equal to the active set (e.g., a global constant set, for example, to 3). Each element of the array would contain the index of the first active_set_size pilots ranked in order of received pilot power at locations where traffic exists. For example, CDMA_Server[p][0] would contain the sector index of the strongest pilot detected at location p.

The process also stores the $E_c/I_{tot\_min}$ ratios in a CDMA_EcIo array corresponding to the elements of the CDMA_Server array [step 840]. In other words, the process uses the highest ranking sorted pilot powers at each location to fill in the array CDMA_EcIo[map_size][active_set_size]. For example, CDMA_EcIo[p][1] would contain the $E_c/I_{tot\_min}$ of the second strongest pilot detected at location p.

The process then goes over the entire map to determine the number of best server locations belonging to a particular CDMA server [step 845]. The process assigns each location to an appropriate quantity of traffic based on the total Erlang traffic assigned to its best server sector by the user [step 850]. Finally, the process populates the traffic array CDMA_Traffic[map_size], where map_size represents the number of locations on the map and each element of the array contains the Erlang traffic assigned to that location [step 855].

II. Determine Sector Load [Step 720]

The initial estimation process determines the sector load by calculating the number of users, CDMA_Sector_Load, (equivalently represented as traffic, in Erlangs) that is being carried by each CDMA sector. The process may use predefined handoff probabilities. The handoff probabilities indicate the likelihood of a wireless station being in single, 2-way, or 3-way handoff with more than one cell site. Such probabilities may be located in, for example, main memory 204, or read in from an external source, such as from an external database.

The handoff probabilities are a function of wireless station velocity, handoff condition of the three strongest pilots, the amount of traffic added per sector ($T_{add}$), the amount of traffic dropped per sector ($T_{drop}$), and the ratios r2 and r3; where the ratios r2, r3 ∈{0,1,2,3, . . . ,24} represent, respectively, the ratios (in dB) of CDMA_EcIo[p][0]/CDMA_EcIo[p][1] and CDMA_EcIo[p][0]/CDMA_EcIo[p][2], where CDMA_EcIo[p][0], CDMA_EcIo[p][1] and CDMA_EcIo[p][2] contain the $E_c/I_{tot\_min}$ of the three strongest pilots detected at location p. The handoff probabilities read from an external database also take into account the effects due to Rayleigh and Rician fading, lognormal shadowing, the power control employed on the overall required $E_b/N_o$ and the resultant mean required traffic power.

The initial estimation process determines the traffic loading at a particular sector by going over the entire map and then incrementally updating the traffic load of the active set pilots at that wireless station location p. The process also uses the mean power required at each location carrying a certain amount of traffic to estimate a weighted sum of the traffic load carried by that sector.

III. Determine Cell Site Transmit Power [Step 730]

The initial estimation process defines the total transmit power for any sector by using the sector load CDMA_Sector_Load together with the voice activity factor v, the traffic, pilot, sync, and paging channel powers. The total transmit power, which is calculated for every sector k in the network, may be defined as:

$$CDMA\_fw\_tx\_pow[k] = P_{pilot_k} + P_{sync_k} P_{paging_k} + CDMA\_Sector\_Load[k].v.P_{traffic\_nominal_k} \quad (15)$$

where $P_{traffic\_nominal_k}$ is the nominal transmit power allocation of a traffic channel at sector k.

IV. Determine Total Interference Power [Step 740]

The initial estimation process determines, for every location p, the cumulative interference power I_tot[p] received from every sector in the network plan from the following equation:

$$I\_tot[p] += CDMA\_fw\_tx\_pow[s] - path\_loss(s,p). \quad (16)$$

The term path_loss(s,p) represents the path loss between location p and sector s, after applying corrections for the wireless station antenna gain and head or body loss. The variable no_cdma_sectors represents the total number of CDMA sectors in the plan. This computation of the cumulative interference I_tot is independent of sector sizes or beacon sectors.

V. Determine Hand-down Traffic and Generate CDMA-only Traffic Map [Step 750]

The initial estimation process determines the hand-down traffic in the planned network. This process of determining whether the CDMA traffic at a particular location p should be handed down to analog is different for beacons and borders. For beacons, if the received $E_c/I\_tot$ from any beacon at any location is greater than the "beacon-threshold," the traffic at that location is handed down to the analog system and this traffic is denoted as beacon traffic. For borders, if all the pilots in the active set at any location are borders and the received $E_c/I\_tot$ from all the borders at this location satisfy the "border-threshold" criterion, then the traffic at that location is handed down to the analog system and this traffic is denoted as border traffic.

This determination of hand-down traffic may be performed in a two-step process. First, at every location p (within the user-defined range of calculation), the process compares the $E_c/I\_tot$ value of any beacon pilot in the network to the "beacon-threshold." If it is above the threshold, that traffic is handed down to the analog system and the traffic corresponding to this location in the CDMA_Traffic array and in a Beacon_traffic array is updated. If it is below the threshold, that traffic remains as CDMA traffic.

Second, the process compares the $E_c/I\_tot$ value of any border pilot in the array CDMA_Server to the "border-threshold" criterion. If it satisfies the criterion and all the pilots CDMA_Server[p][m], m $\in$ [0 . . . active_set_size−1] (i.e., in the "active set") at this location p are borders, that traffic is handed down to the analog system and the traffic corresponding to this location in the CDMA_Traffic array and in a Border_traffic array is updated. If the criterion is not satisfied, that traffic remains as CDMA traffic. Using the above-described information, the initial estimation process generates a CDMA-only traffic map (i.e., a map of the digital traffic to be supported by the CDMA network).

VI. Re-compute Sector Load, Transmit Power, and Total Interference Power [Step 760]

The initial estimation process then re-computes the sector load, the transmit power, and the interference power based on the hand-down traffic determinations in step 750. This may be accomplished by first re-computing the sector load and cell site transmit power, and then re-computing the total interference (I_tot). Since the CDMA traffic has changed for all borders and regular CDMA sectors having beacons as their neighbors, the load for these sectors needs to be re-computed using the new values of Erlang traffic in the CDMA_Traffic array.

The initial estimation process then re-computes 1tot using equation (16) to update the interference power I_tot at all locations pertaining to border sectors. The initial estimation process also updates the array CDMA_EcIo for later use in a complete network analysis.

Finally, the updated information contained in CDMA_Server (CDMA probable servers), I_tot (the total received power) and CDMA_Traffic (a traffic map listing the CDMA-only traffic in Erlangs) at each location is passed on to a reverse link analysis sub-module and then on to a forward link analysis sub-module as part of a full-scale network analysis.

CONCLUSION

Systems and methods consistent with the present invention aid network designers by providing a quick and accurate mechanism for evaluating the performance of a communication network. A system consistent with the present invention determines the pilot strength and interference at each location in the communication network. The system then determines pilot strength to interference ratios for each location in the communication network. The system is capable of providing the network designer with a quick estimate of the performance of the communication network by using the determined ratios.

The Ec/Io Analysis, Pilot Management, and Initial Estimation processes provide a quick and accurate estimation of network performance compared to conventional techniques. These processes are superior to conventional techniques because they:

Account for the distribution of the traffic in a CDMA network to define the total interference of a network plan and uses this information to determine the total power necessary to transmit;

Take into account network-specific parameters, such as sector size;

Account for the behavior of various types of cell sites, such as traffic, border, and beacon cell sites, and the interaction of these cell sites with each other;

Provide the ability to determine the traffic to be handed down to analog, as a function of user-defined network parameters;

Provide the ability to handle inputs, such as a number of Walsh codes and the average traffic power per Walsh code;

Determine accurate representation of sector transmit power in relation to the offered traffic requirements per cell;

Provide the ability to trade off various levels of system accuracy with speed and complexity;

Provide the ability to use a signal threshold to determine the appropriate number of signals to observe;

Provide the ability to determine the best server and hence the highest Ec/Io at a location; and Provide the ability to represent the results in report or map format.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while a series of steps have been provided with respect to FIGS. 3, 5A, 5B, 7, 8A, and 8B, the order of the steps does not matter.

The following claims and their equivalents define the scope of the invention.

What is claimed is:

1. A method for estimating a performance of a digital network having one or more sectors, the method comprising:

identifying probable servers for every location in the network;

determining network conditions;

determining hand-down traffic to analog;

generating a traffic map based on the determined hand-down traffic;

re-computing the network conditions based on the generated traffic map; and estimating the performance of the network using the re-computed network conditions.

2. The method of claim 1 wherein the determining network conditions includes:

determining a traffic load of each sector, determining a cell site transmit power, and determining a total interference power.

3. The method of claim 1 wherein the identifying probable servers includes:

determining a strength of a received pilot signal at each location from every sector, determining a minimum interference power at each location, determining pilot strength-to-interference values for every location within a sector, and determining an initial best server area for each location.

4. The method of claim 3 wherein the identifying probable servers includes further includes:

sorting the determined pilot strength-to-interference values for each location, and storing the determined pilot strength-to-interference values.

5. The method of claim 3 wherein the determining an initial best server area includes:

comparing determined pilot strength-to-interference values for a location with a threshold value, and selecting those determined pilot strength-to-interference values that exceed the threshold value.

6. The method of claim 5 wherein the sorting includes:

sorting the selected values in descending order.

7. The method of claim 1 wherein the determining a cell site transmit power includes:

determining the cell site transmit power for each sector using the determined traffic load for a respective sector and user-defined parameters.

8. The method of claim 7 wherein the determining a cell site transmit power includes:

determining the cell site transmit power for each sector using the determined traffic load for a respective sector and one or more of a voice activity factor, a traffic channel power value, a sync channel power value, and a paging channel power value.

9. The method of claim 3 wherein the determining hand-down traffic includes:

comparing, at one or more locations, a determined pilot strength-to-interference value of a beacon pilot signal to a beacon threshold value, comparing, at one or more locations, a determined pilot strength-to-interference value of a border pilot signal to a border threshold criterion, and identifying traffic as hand-down traffic when the determined pilot strength-to-interference value of the beacon pilot signal exceeds the beacon threshold or the determined pilot strength-to-interference value of the border pilot signal satisfies the border threshold criterion.

10. A system for estimating a performance of a digital network having one or more sectors, the system comprising:

means for identifying probable servers for every location in the network;

means for determining network conditions;

means for determining hand-down traffic to analog;

means for generating a traffic map based on the determined hand-down traffic;

means for re-computing the network conditions based on the generated traffic map; and means for estimating the performance of the network using the re-computed network conditions.

11. A system for estimating a performance of a digital network having one or more sectors, the system comprising:

a memory for storing instructions; and a processor configured to execute the instructions to identify probable servers for every location in the network, determine network conditions, determine hand-down traffic to analog, generate a traffic map based on the determined hand-down traffic, re-compute the network conditions based on the generated traffic map, and estimate the performance of the network using the re-computed network conditions.

12. The system of claim 11 wherein, when determining network conditions, the processor is further configured to:

determine a traffic load of each sector, determine a cell site transmit power, and determine a total interference power.

13. The system of claim 11 wherein, when identifying probable servers, the processor is further configured to:

determine a strength of a received pilot at each location from every sector, determine a minimum interference power at each location, determine pilot strength-to-interference values for every location within a sector, and determine an initial best server area for each location.

14. The system of claim 13 wherein, when identifying probable servers, the processor is further configured to:

sort the determined pilot strength-to-interference values for each location, and store the determined pilot strength-to-interference values in the memory.

15. The system of claim 13 wherein, when determining an initial best server area, the processor is further configured to:

compare determined pilot strength-to-interference values for a location with a threshold value, and select those determined pilot strength-to-interference values that exceed the threshold value.

16. The system of claim 15 wherein, when sorting, the processor is further configured to:

sort the selected values in descending order.

17. The system of claim 11 wherein, when determining a cell site transmit power, the processor is further configured to:

determine the cell site transmit power for each sector using the determined traffic load for a respective sector and user-defined parameters.

18. The system of claim 17 wherein, when determining a cell site transmit power, the processor is further configured to:

determine the cell site transmit power for each sector using the determined traffic load for a respective sector and one or more of a voice activity factor, a traffic channel power value, a sync channel power value, and a paging channel power value.

19. The system of claim 13 wherein, when determining hand-down traffic, the processor is further configured to:
compare, at one or more locations, a determined pilot strength-to-interference value of any beacon pilot signal to a beacon threshold value, and
compare, at one or more locations, a determined pilot strength-to-interference value of any border pilot signal to a border threshold criterion; and
mark traffic as hand-down traffic when the determined pilot strength-to-interference value of the beacon pilot signal exceeds the beacon threshold or the determined pilot strength-to-interference value of the border pilot signal satisfies the border threshold criterion.

20. A method for estimating a performance of a network having one or more sectors, the method comprising:
determining a pilot strength value at each portable location in the network;
determining an interference value at each portable location in the network;
determining pilot strength-to-interference values at each portable location in the network based on the determined pilot strength values and the interference values;
determining network conditions;
determining hand-down traffic to analog;
generating a traffic map based on the determined hand-down traffic;
re-computing the network conditions based on the generated traffic map; and
estimating the performance of the network based on the determined pilot strength-to-interference values, the estimating including using one or more of traffic channel power, sync channel power, paging channel power, forward cable loss, head loss, frequency, portable antenna gain, portable noise figure, sector size, sector type, number of channels, and power per channel to estimate the performance.

21. The method of claim 20 wherein the determining an interference value includes:
determining an interference value based on path loss data and at least one user-provided parameter.

22. The method of claim 21 wherein the determining pilot strength-to-interference values includes:
determining an interference value based on path loss data and at least one channel power value.

23. The method of claim 20 wherein the one or more of traffic channel power, sync channel power, paging channel power, forward cable loss, head loss, frequency, portable antenna gain, portable noise figure, sector size, sector type, number of channels, and power per channel are provided by a user.

24. The method of claim 20 further comprising:
graphically providing a representation of the estimating to a user, the graphical representation distinguishing different levels of pilot strength-to-interference values.

25. The method of claim 20 wherein the determining an interference value includes:
determining an interference value at a point in the network based on a predetermined point-to-point path loss and at least one user-provided parameter.

26. The method of claim 25 wherein the determining an interference value includes:
determining the interference value based on the predetermined point-to-point path loss and at least one channel power value.

27. The method of claim 25 further comprising:
determining pilot strength-to-interference values at the point in the network that are above a threshold;
determining a distance between the point in the network and a base station; and
determining whether the distance is within a sector size of the base station.

28. The method of claim 27 further comprising:
determining if a sector in which the point is located is a traffic, border, or beacon sector.

29. The method of claim 27 wherein the estimating includes:
graphically providing a representation of the estimating to a user, the graphical representation depicting a list of the pilot strength to interference values above the threshold for the point in the network.

30. A system for estimating a performance of a network having one or more sectors, the method comprising:
a memory for storing instructions; and
a processor configured to execute the instructions to determine a pilot strength value at each portable location in the network; determine an interference value at each portable location in the network; determine pilot strength-to-interference values at each portable location in the network using the determined pilot strength and interference values; determine network conditions; determine hand-down traffic to analog; generate a traffic map based on the determined hand-down traffic; recompute the network conditions based on the generated traffic map; and estimate the performance of the network based on the determined pilot strength-to-interference values and using one or more of traffic channel power, sync channel power, paging channel power, forward cable loss, head loss, frequency, portable antenna gain, portable noise figure, sector size, sector type, number of channels, and power per channel.

31. The system of claim 30 wherein, when determining an interference value, the processor is further configured to:
determine an interference value based on path loss data and at least one user-provided parameter.

32. The system of claim 31 wherein, when determining an interference value, the processor is further configured to:
determine the interference value based on path loss data and at least one channel power value.

33. The system of claim 30 wherein the one or more of traffic channel power, sync channel power, paging channel power, forward cable loss, head loss, frequency, portable antenna gain, portable noise figure, sector size, sector type, number of channels, and power per channel are provided by a user.

34. The system of claim 30 wherein the processor is further configured to:
provide a result of the estimating to a user, the result being a graphical representation distinguishing different levels of pilot strength-to-interference values.

35. The system of claim 30 wherein, when determining an interference value, the processor is further configured to:
determine an interference value at a point in the network based on a predetermined point-to-point path loss and at least one user-provided parameter.

36. The system of claim 35 wherein, when determining an interference value, the processor is further configured to:

determine the interference value based on the predetermined point-to-point path loss and at least one channel power value.

37. The system of claim 35 wherein the processor is further configured to:

determine pilot strength-to-interference values at the point in the network that are above a threshold;

determine a distance between the point in the network and a base station; and determine whether the distance is within a sector size of the base station.

38. The system of claim 37 wherein the processor is further configured to:

determine if a sector in which the point is located is a traffic, border, or beacon sector.

39. The system of claim 37 wherein, when estimating, the processor is further configured to:

provide a result of the estimating to a user, the result having a list of the pilot strength to interference values above the threshold for the point in the network.

40. A computer-readable medium containing instructions for controlling at least one processor to perform a method that estimates performance of a network, the method comprising:

determining a pilot strength value at each portable location in the network;

determining an interference value at each portable location in the network;

determining pilot strength-to-interference values at each portable location in the network;

determining network conditions;

determining hand-down traffic to analog;

generating a traffic map based on the determined hand-down traffic;

re-computing the network conditions based on the generated traffic map;

estimating the performance of the network based on the determined pilot strength-to-interference values; and graphically providing a representation of the estimating to a user, the graphical representation depicting a list of pilot strength-to-interference values above a threshold for a user-specified point in the network.

41. The computer-readable medium of claim 40 wherein the estimating includes:

graphically providing a representation of the estimating to a user, the graphical representation distinguishing different levels of pilot strength-to-interference values.

42. A computer-readable medium containing instructions for controlling at least one processor to perform a method that estimates performance of a digital network, the method comprising:

identifying probable servers for every location in the network;

determining network conditions;

determining hand-down traffic to analog;

generating a traffic map based on the determined hand-down traffic;

re-computing the network conditions based on the generated traffic map; and estimating the performance of the network using the re-computed network conditions.

* * * * *